United States Patent Office.

MARY A. SHEAFFER, OF ELIZABETHTOWN, PENNSYLVANIA.

Letters Patent No. 97,709, dated December 7, 1869.

---

IMPROVEMENT IN PROCESS FOR MANUFACTURING CHEESE.

---

The Schedule referred to in these Letters Patent and making part of the same.

---

I, MARY A. SHEAFFER, residing near the borough of Elizabethtown, in the county of Lancaster, and State of Pennsylvania, have invented a certain new and improved Process in the Manufacture of Cheese, of which the following is a specification of the ingredients and manner of making.

The object of my process or invention is to produce a superior kind of scalded cheese, by utilizing the thick milk usually fed to the hogs, so that it may be adapted for restaurants, and to keep good for months for family-use.

To enable others to make said cheese, I will now describe my mode or process for making the same.

I take the thick milk, from which the cream has been previously skimmed, say twenty gallons. This I first put into a kettle, and boil it till well scalded. This is then put into a bag, and allowed to drain in the usual way. The bag with its contents is then soaked in tepid water in cold weather, (common well or spring water will answer in warm weather,) and when soaked therein, say from four to five hours, it is taken out and subjected to pressure, so as to expel all the water. When comparatively dry, the contents of the bag are poured upon a table, and all crumbled into small pieces (called cheese-rivels) by hand, adding two handfuls (say a gill and a half) of fine salt, well mixed in. These rivels are then put into a new or clean muslin bag, loosely tied, and laid upon a slatted table, so that a free circulation of air has access to all points. Attention is given by occasionally shaking and turning the bag, to secure a more uniform temperature to the mass, and when it begins to gum or become sticky, it is ready for the second boiling. This is given to it in a kettle, placed within a larger kettle provided with boiling water, to prevent burning. I now add one-fourth pound of butter, four table-spoonfuls of white sugar, and four or five eggs, well beaten up, before the material has been heated to the boiling-point. This heat is continued until the material becomes ropy on drawing out, and when cool, firm enough to allow being cut with a knife.

This now forms my improved scalded cheese for which I find so great a demand in our market, as a decided improvement over all cheese of this character heretofore known.

This cheese is simply poured into pans, first covered with a cloth, on which it becomes firm, of a rich color, and so highly approved of.

To convert this cheese into a still more firm body, and give it durability or the property to remain good for months, say two days after made as before said, the cheese is put into a vessel or vessels, covered, and again brought to a boiling heat. This third boiling results in producing a cheese deemed superior, and ardently sought after by keepers of restaurants and eating-houses, as well as others.

I am aware that numerous kinds of cheese are made from sweet milk with the cream, as also the ordinary scalded cheese, but I am not aware of this mode or process having been ever known or used before.

What I claim is, the above-described composition and mode of making my compound scalded cheese, substantially in the manner described.

MARY A. SHEAFFER.

Witnesses:
WM. B. WILEY,
JACOB STAUFFER.